(12) United States Patent
Zhou

(10) Patent No.: US 10,168,928 B2
(45) Date of Patent: ***Jan. 1, 2019

(54) MANAGING DATA STORAGE BY AN ASYNCHRONOUS COPY SERVICE

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/455,184

(22) Filed: Mar. 10, 2017

(65) Prior Publication Data

US 2018/0260146 A1    Sep. 13, 2018

(51) Int. Cl.
*G06F 3/06* (2006.01)
*G06F 11/14* (2006.01)
*G06F 13/16* (2006.01)

(52) U.S. Cl.
CPC .......... *G06F 3/0619* (2013.01); *G06F 3/065* (2013.01); *G06F 3/067* (2013.01); *G06F 11/1451* (2013.01); *G06F 13/161* (2013.01); *G06F 11/1464* (2013.01)

(58) Field of Classification Search
CPC ........ G06F 3/0619; G06F 3/065; G06F 3/067; G06F 11/1451; G06F 11/1464; G06F 13/161
See application file for complete search history.

(56) References Cited

U.S. PATENT DOCUMENTS

| 5,446,871 | A  | 8/1995 | Shomler et al. |
|---|---|---|---|
| 7,133,983 | B2 | 11/2006 | Bartfai et al. |
| 7,650,385 | B2 | 1/2010 | Chen et al. |
| 8,332,354 | B1 | 12/2012 | Chatterjee et al. |
| 9,330,048 | B1 | 5/2016 | Bhatnagar et al. |
| 9,652,414 | B1 | 5/2017 | Bhatnagar et al. |
| 2008/0177963 | A1 | 7/2008 | Rogers |
| 2010/0205392 | A1 | 8/2010 | Schnapp et al. |
| 2012/0185433 | A1 | 7/2012 | Harris, Jr. et al. |

(Continued)

OTHER PUBLICATIONS

EMC[2], "Best Practices for Data Replication with EMC Isilon SyncIQ", EMC2[2], White Paper, Feb. 2016, pp. 1-39, <https://www.emc.com/collateral/hardware/white-papers/h8224-replication-isilon-synciq-wp.pdf>.

(Continued)

*Primary Examiner* — Aracelis Ruiz
(74) *Attorney, Agent, or Firm* — Daniel R. Simek

(57) ABSTRACT

A method for managing data replicated by an asynchronous copy service. The method includes a computer processor identifying a set of information associated with an element of data stored in an I/O queue. The method further includes modifying an order to transmit elements of data in the I/O queue based, at least in part, on the identified set of information associated with the element of data in the I/O queue. The method further includes transmitting one or more elements of data in the I/O queue, to a secondary storage location that is network accessible, based at least in part on the order to transmit elements of data in the I/O queue.

18 Claims, 6 Drawing Sheets

(56) References Cited

U.S. PATENT DOCUMENTS

2013/0042083 A1\* 2/2013 Mutalik ............ G06F 17/30162
711/162
2015/0381726 A1 12/2015 Hathorn et al.
2016/0283130 A1 9/2016 Gupta et al.

OTHER PUBLICATIONS

Hewlett Packard Enterprise, "HPE 3 PAR Replication Software Suite", Data Sheet, Nov. 2015, Rev. 5, pp. 1-8, <https://www.hpe.com/h20195/v2/getpdf.aspx/4AA4-4251ENW.pdf?ver=2.0>.
List of IBM Patents or Patent Applications Treated as Related, Appendix P, Filed Herewith, 2 pages.
Zhou, et al., "Managing Data Storage by an Asynchronous Copy Service", U.S. Appl. No. 15/854,910, filed Dec. 27, 2017.

\* cited by examiner

| WRITE SEQ. 301 | I/O SEQ. 302 | DATA ID 303 | I/O OWNER (RPO VALUE) 304 | WAIT TIME IN QUEUE (SEC) 305 | PI% @ RPO=2 306 | PI% @ RPO=5 307 | PI% @ RPO=10 308 |
|---|---|---|---|---|---|---|---|
| 1 | 100 | A | APP2 (10) | 11.0 | | | 110% |
| 2 | 101 | B | APP1 (5) | 5.4 | | 108% | |
| 3 | 103 | C | APP3 (2) | 3.0 | 150% | | |
| 4 | 104 | D | APP2 (5) | 2.6 | | 52% | |
| 5 | 106 | E | APP1 (5) | 2.4 | | 48% | |
| 6 | 107 | F | APP3 (5) | 2.2 | | 44% | |
| 7 | 109 | G | APP1 (2) | 2.1 | 105% | | |
| 8 | 111 | H | APP3 (5) | 1.8 | | 36% | |
| 9 | 112 | I | APP1 (10) | 1.6 | | | 16% |
| 10 | 114 | J | APP2 (5) | 1.4 | | 28% | |
| 11 | 115 | K | APP1 (10) | 1.2 | | | 12% |
| 12 | 117 | L | APP2 (5) | 1.0 | | 20% | |
| 13 | 119 | M | APP3 (10) | 0.8 | | | 8% |
| 14 | 120 | N | APP2 (2) | 0.6 | 30% | | |
| 15 | 121 | P | APP1 (10) | 0.4 | | | 4% |
| 16 | 122 | Q | APP1 (2) | 0.2 | 10% | | |

| WRITE SEQ. 301 | I/O SEQ. 302 | DATA ID 303 | I/O OWNER (RPO VALUE) 304 | WAIT TIME IN QUEUE (SEC) 305 | PI% @ RPO=2 306 | PI% @ RPO=5 307 | PI% @ RPO=10 308 |
|---|---|---|---|---|---|---|---|
| 1 | 103 | C | APP3 (2) | 3.0 | 150% | | |
| 2 | 109 | G | APP1 (2) | 2.1 | 105% | | |
| 3 | 120 | N | APP2 (2) | 0.6 | 30% | | |
| 4 | 122 | Q | APP1 (2) | 0.2 | 10% | | |
| 5 | 101 | B | APP1 (5) | 5.4 | | 108% | |
| 6 | 104 | D | APP2 (5) | 2.6 | | 52% | |
| 7 | 106 | E | APP1 (5) | 2.4 | | 48% | |
| 8 | 107 | F | APP3 (5) | 2.2 | | 44% | |
| 9 | 111 | H | APP3 (5) | 1.8 | | 36% | |
| 10 | 114 | J | APP2 (5) | 1.4 | | 28% | |
| 11 | 117 | L | APP2 (5) | 1.0 | | 20% | |
| 12 | 100 | A | APP2 (10) | 11.0 | | | 110% |
| 13 | 112 | I | APP1 (10) | 1.6 | | | 16% |
| 14 | 115 | K | APP1 (10) | 1.2 | | | 12% |
| 15 | 119 | M | APP3 (10) | 0.8 | | | 8% |
| 16 | 121 | P | APP1 (10) | 0.4 | | | 4% |

FIG. 3b

| WRITE SEQ. 301 | I/O SEQ. 302 | DATA ID 303 | I/O OWNER (RPO VALUE) 304 | WAIT TIME IN QUEUE (SEC) 305 | PI% @ RPO=2 306 | PI% @ RPO=5 307 | PI% @ RPO=10 308 |
|---|---|---|---|---|---|---|---|
| 1 | 103 | C | APP3 (2) | 3.0 | 150% | | |
| 2 | 100 | A | APP2 (10) | 11.0 | | | 110% |
| 3 | 101 | B | APP1 (5) | 5.4 | | 108% | |
| 4 | 109 | G | APP1 (2) | 2.1 | 105% | | |
| 5 | 104 | D | APP2 (5) | 2.6 | | 52% | |
| 6 | 106 | E | APP1 (5) | 2.4 | | 48% | |
| 7 | 107 | F | APP3 (5) | 2.2 | | 44% | |
| 8 | 111 | H | APP3 (5) | 1.8 | | 36% | |
| 9 | 120 | N | APP2 (2) | 0.6 | 30% | | |
| 10 | 114 | J | APP2 (5) | 1.4 | | 28% | |
| 11 | 117 | L | APP2 (5) | 1.0 | | 20% | |
| 12 | 112 | I | APP1 (10) | 1.6 | | | 16% |
| 13 | 115 | K | APP1 (10) | 1.2 | | | 12% |
| 14 | 122 | Q | APP1 (2) | 0.2 | 10% | | |
| 15 | 119 | M | APP3 (10) | 0.8 | | | 8% |
| 16 | 121 | P | APP1 (10) | 0.4 | | | 4% |

MANAGING DATA STORAGE BY AN ASYNCHRONOUS COPY SERVICE

BACKGROUND OF THE INVENTION

The present invention relates generally to the field of data storage, and more particularly to replicating data to another storage location utilizing an asynchronous copy service.

Data replication is utilized to prevent damage and/or data loss from failures or disasters that occur at one location by storing a copy of the data to another physical location, often a distance away from the primary storage location of the data. Data replication differs from data backup. Data backup saves a copy of data that is unchanged for a long period of time. Data replication occurs frequently; therefore, the current version of the data is relatively recent and the historical state of the data may change significantly. For example, financial transaction data may be frequently replicated to minimize possible impacts to customers. Two data replication strategies are synchronous data replication and asynchronous data replication. Synchronous data replication utilizes more system and network resources to guarantee zero data loss between the primary (e.g., local) location and secondary storage locations. However, a write acknowledgement (ack) message is required from both storage locations before other operations that affect the stored data can occur. Thus, based on the distance between storage locations, the latency of a communication network can create delays and degrade the performance of an application that utilizes and/or creates the data.

Asynchronous replication allows an application to proceed as soon as a write ack message is received from local storage (e.g., the primary storage location). Data replication to the secondary location can be delayed based on resource availability of a computer system and/or occurs via a slower, cheaper network connection. However, based on delays associated with writing data to a secondary storage location an out-of-sync condition occurs, where for a period of time the data stored on the secondary storage location differs from data stored within the primary storage location.

SUMMARY

According to aspects of the present invention, there is a method, computer program product, and/or system for managing an asynchronous copy service. In an embodiment, the method includes one or more computer processors identifying a set of information associated with an element of data stored in an I/O queue. The method further includes modifying an order to transmit elements of data in the I/O queue based, at least in part, on the identified set of information associated with the element of data in the I/O queue. The method further includes transmitting one or more elements of data in the I/O queue, to a secondary storage location that is network accessible, based at least in part on the order to transmit elements of data in the I/O queue.

BRIEF DESCRIPTION OF THE DRAWINGS

FIGS. 3a, 3b, and 3c depict illustrative examples of tables of information associated with managing a queue of elements of data utilizing an asynchronous copy service, in accordance with an embodiment of the present invention.

DETAILED DESCRIPTION

Figure 1:
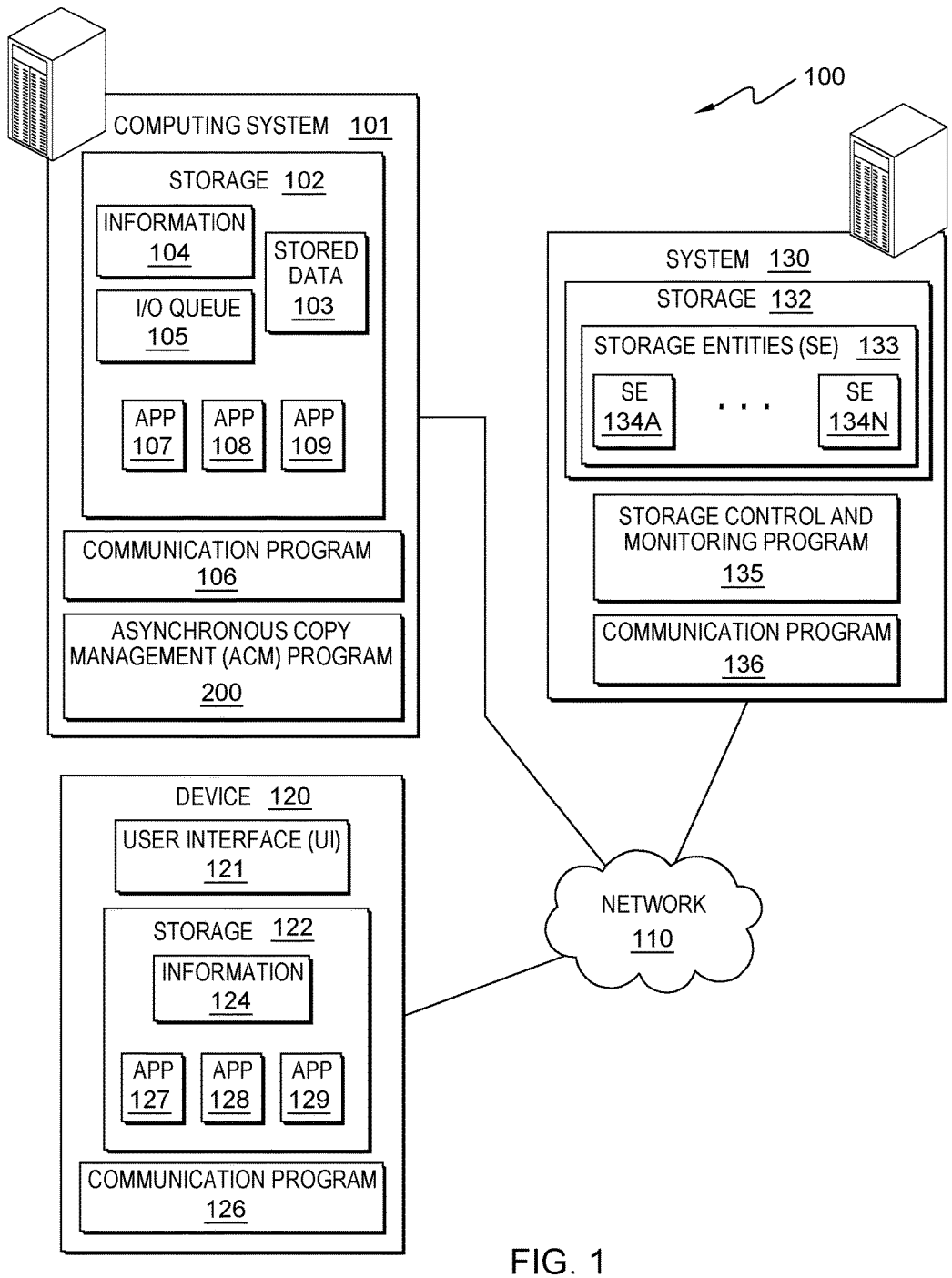
FIG. 1 illustrates a networked computing environment, in accordance with an embodiment of the present invention.

Embodiments of the present invention recognize that periodic copying of data to one or more secondary storage location is utilized to reduce the impacts of data corruption or a failure within a primary storage system for the data. One strategy to protect data that can change frequently is to utilize data replication, such as an asynchronous copy service. An asynchronous copy service may be, for example, a plug-in or program that executes in the background that automatically replicates data to a secondary storage location without user intervention.

Embodiments of the present invention recognize that since the copy is asynchronous, some data between the primary and secondary storage locations may be out-of-sync (e.g., not identical) during a window of time. With respect to disaster recovery or business continuity planning, embodiments of the present invention recognize that the time between replications of data is related to the importance or a level of criticalness of the data. As such, embodiments of the present invention recognize that each file, table, file fragment (e.g., an extent), and/or database, etc., herein referred to as elements of data, that are replicated, can have a recovery point objective (RPO) value. An RPO value is a maximum, targeted period of time, as defined by a user, during which the data between a primary storage location and a corresponding secondary storage location are out-of-sync. Critical data is assigned smaller RPO values (e.g., windows of time), and less critical data is assigned larger RPO values. However, embodiments of the present invention also recognize that within computing environments shared by a plurality of users and executing applications, such as networked computing environments or cloud computing environments that various strategies incorporating an asynchronous copy service to replicated data do not account for sharing or prioritizing the replication of a plurality of data to secondary storage locations.

Embodiments of the present invention address the issue of prioritizing and replicating a plurality of elements of data to a secondary storage location, by defining a Priority Index percentage (PI %) for each element of data associated with a queue utilized by an asynchronous copy service. Embodiments of the present invention determine a set of information related to each element of data within a write queue, a write buffer, a data cache; herein referred to as an input/output (I/O) queue. Information related to an element of data for replication may include: an identifier, such as a file name; an owner; a location to store the element of data, such as address and storage volume; a wait time in the I/O queue value; a RPO value; a calculated PI %; and set of memory locations for the element of data. A "wait time in queue" is a duration of time that an element of data resides in an I/O queue prior to replication to a secondary storage location.

Embodiments of the present invention calculate a PI % based on dividing the wait time in queue for an element of data by an RPO value corresponding to the element of data. Some embodiments of the present invention include one or more factors with the wait time in queue for an element of data in response to calculating a PI %. Various factors that affect the PI % for an element of data include (i) delays within the network that sends the data to a secondary storage location and returns messages from the secondary storage location and (ii) delays writing data within a secondary storage system. Other factors that can affect a PI % are a size corresponding to an element of data and a speed of data transmission via a network.

Embodiments of the present invention utilize the priority index percentages to modify an I/O queue to avoid or minimize exceeding RPO values for elements of data within the I/O queue. Embodiments of the present invention modify an I/O queue based on ordering the write sequence for elements of data within the I/O queue based on decreasing PI % values corresponding to each element of data within the I/O queue. By utilizing PI % values that utilize the wait time in an I/O queue as a factor, embodiments of the present invention balance starving or overloading a write operation that previously may have been based more on a RPO value or other customer dictate. Various embodiments of the present invention continue to loop and modify an I/O queue as one or more elements of data are removed from the queue in response to a successful write to secondary storage, one or more new elements of data are added to the I/O queue, and information related to writing data (e.g., delays) is received.

Other embodiments of the present invention can include other criteria or conditions to determining a write sequence for elements of data within an I/O queue. In one scenario, based on the size of an element of data to transfer to a secondary storage location and a data transfer rate of a network connection, other embodiments of the present invention may estimate delays in processing elements of data within an I/O queue and proactively modify PI % values and update a write sequence for one or more elements of data within the I/O queue based on estimated delays. In another scenario, information associated with one or more users may indicate different cost/risk preferences that can be utilized to bias calculated PI % values and thereby modify a write modify a write sequences for elements of data within an I/O queue. In one example, a user may have a preference to bias PI % values for some elements of data, such as biasing the PI % values for RPO values of 5 seconds or less by +10% to and biasing PI % values for elements of data with RPO values greater than 30 seconds by −15%. In another example, shorter RPO values take priority in a write sequence for an I/O queue for PI % values that are similar within a threshold, such as +/−5%. An element of data with a RPO value of 5 seconds and a PI % value of 14% would take precedence over an element of data with a RPO value of 20 seconds and a PI % value of 10%. Various embodiments of the present invention can apply various combinations of calculations, estimations, techniques, preferences, and user information to modify a write sequence of an I/O queue based, at least in part, on PI % values for elements of data within the I/O queue.

Further, embodiments of the present invention reduce the risks of data loss or corruption to a user (e.g., a customer) by minimize out-of-sync window of time for an element of data replicated from a primary storage location to a secondary storage location by an asynchronous copy service. As such, embodiments of the present invention prioritize a write sequence of elements of data of an I/O queue within one computing system for transmission to a secondary storage system (e.g., another computing system) based on a calculation related to a wait time in the I/O queue and an RPO value of each element of data. The response of an asynchronous copy service is seen to be improved in at least these aspects. Similarly, by incorporating various factors related to network communications and workloads on a storage system the response of an asynchronous storage service and an experience of the user utilizing the asynchronous storage service to replicate data can be further improved.

The present invention will now be described in detail with reference to the Figures. FIG. 1 is a functional block diagram illustrating networked computing environment 100 in an embodiment, in accordance with the present invention. In an embodiment, networked computing environment 100 includes: computing system 101, device 120, and one or more instances of system 130, all interconnected over network 110. Many modifications to the depicted environment may be made by those skilled in the art without departing from the scope of the invention as recited by the claims.

Computing system 101, device 120, and system 130 may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computer systems known in the art. In certain embodiments, computing system 101, device 120, and system 130 represent computer systems utilizing clustered computers and components (e.g., database server computers, application server computers, etc.) that act as a single pool of seamless resources when accessed through network 110, as is common in data centers and with cloud-computing applications. In general, computing system 101, device 120, and system 130 are representative of any programmable electronic device or combination of programmable electronic devices capable of executing machine-readable program instructions and communicating with users of computing system 101, device 120, and system 130, via network 110. Computing system 101, device 120, and system 130 may include components, as depicted and described in further detail with respect to FIG. 4, in accordance with embodiments of the present invention.

Computing system 101 includes: storage 102, communication program 106, and asynchronous copy management program (ACM) program 200. In some embodiments, computing system 101 utilizes an instance of system 130 as a secondary storage location for elements of data generated and/or modified by one more apps executing within computing system 101. In other embodiments, computing system 101 is a primary storage location for elements of data generate by device 120, in response to the execution of one or more apps on device 120, and/or the actions of a user of device 120 interfacing with one or more apps of computing system 101. Subsequently, computing system 101 replicates various elements of data for primary on computing system 101 to an instance of system 130 (e.g., a secondary storage location).

Storage 102 includes stored data 103, information 104, I/O queue 105, applications (apps) app 107, app 108, and app 109. Storage 102 may include both volatile storage media (e.g., random access memory) and non-volatile storage media (e.g., persistent storage devices), such as magnetic tapes, hard-disk drives (HDDs), and/or solid-state drives (SSDs). In various embodiments, storage 102 includes a data buffer (not shown) that temporarily stores one or more elements of data prior to migration (e.g., transfer) to an instance of I/O queue 105. A data buffer may be utilized to delay the addition of one or more elements of data to an instance of I/O queue 105: in response a read lock or a write lock on one or more portions of I/O queue 105; during a modification of an instance I/O queue 105; during a polling event; and/or in response to identifying one or more triggers. Triggers that can affect the utilization of a data buffer include, but are not limited to events, such as delays, outages, and changes in data transmission rate within networked computing system 100, a size (e.g., number of elements of data) of the data buffer, and/or achieving a capacity limit of an instance of I/O queue 105.

In an embodiment, storage 102 may also include various programs and/or databases, such as but not limited to: an operating system, a file management program, a database management system, one or more cryptographic programs, and a web interface, server-side enterprise software, one or more analysis programs, etc. (not shown) utilized by computing system 101. Storage 102 may also include data, such as software libraries, template files, etc. (not shown) that are utilized by computing system 101 and/or one or more apps of computing system 101. In some embodiments, storage 102 includes plug-ins and/or services (not shown) that are utilized by one or more apps of computing system 101. In various embodiments, stored data 103 is stored among non-volatile storage media (e.g., persistent storage devices).

Stored data 103 is a portion of persistent storage allocated from storage 102 that is utilized to store a plurality of elements of data. In one embodiment, stored data 103 includes elements of data that are created, updated, and/or utilized by app 107, app 108, and app 109. In another embodiment, stored data 103 also includes a plurality of elements of data, such as files, tables, file fragment (e.g., an extent), databases, etc. that are created, updated, and/or utilized by app 127, app 128, and/or app 129 of device 120. In some embodiments, stored data 103 is the primary storage location for elements of data associated with various apps. In various embodiments, stored data 103 includes data not stored to a secondary storage location by a synchronous or asynchronous copy service.

Information 104 includes a plurality of profiles and information related to apps of computing system 101 and/or apps of a user of another device and computing system that can access computing system 101 via network 110, such as app 127 of device 120. In one embodiment, information 104 includes a profile associated with each element of data (e.g., a file, a table, and/or a database) of stored data 103 and/or generated by an app of device 120. A profile can represent information including: a size of an element of data; storage account information, such as an identifier for an instance of system 130 that stores data for a respective app (e.g., a World Wide Port Name, a media access control (MAC) address, an Internet protocol (IP) address, or a physical port ID) utilized to communicate data to an instance of system 130; a list of elements of data associated with an app and an indication of which elements of data utilizes an asynchronous copy service; a storage scheme (e.g., format) associated with each element of data, such as a block scheme, extents, a contiguous file scheme, etc. In addition, each profile of information 104 includes information utilized by an asynchronous copy service, such as a storage location or target storage entity for data (e.g., a logical unit number (LUN) or volume identifier) and a RPO time value that corresponds to each element of data stored to a secondary storage location. A profile within information 104 may include additional information that affects a write sequence for elements of data within an I/O queue, such as PI % bias values, techniques utilized for estimating delays, threshold values for determining priorities among elements of date with similar PI % values, etc.

In another embodiment, information 104 also includes a polling rate utilized by ACM program 200 and a speed of communication for various network connections. For example, a large element of data transmitted via a slow network connection induces a delay in writing other elements of data that utilize the same network connection to access a secondary storage location. In some embodiments, additional information within a profile of information 104 can include items related to security, such as a user or process ID and corresponding password or certificate, and a cryptographic method utilized to secure (e.g., encrypt) data. For example, hardware encryption may be faster than software encryption. In various embodiments, information 104 includes information related to an element of data stored within I/O queue 105, such as a write sequence value, an I/O sequence ID, a data name or identifier, wait time value for each I/O sequence number, etc. Other information included within information 104 related to I/O queue 105 is described in further detail with respect to FIGS. 3a, 3b, and 3c.

I/O queue 105 is a data structure within storage 102 of computing system 101. I/O queue 105 is comprised of a plurality of elements of data and related information. In one embodiment, I/O queue 105 is stored within volatile memory, such as random-access memory (RAM) allocated to storage 102. In some embodiments, I/O queue 105 is a data buffer not constrained by a specific order of the included elements of data. In an example, I/O queue 105 may utilize a hash function to relate a location of each element of data in memory (e.g., RAM) to information included within information 104. In another embodiment, I/O queue 105 is based on a first-in-first-out (FIFO) data structure that can be dynamically modified by ACM program 200. In other embodiments, storage 102 includes multiple instances of I/O queue 105. In one example, a first instance of I/O queue 105 is utilized for data received from app 127 and 128 of device 120 for primary storage to stored data 103 and a second instance of I/O queue 105 is utilized for data associated with an asynchronous copy service. In another example, instances of I/O queue 105 are associated with one or more constraints, such as assignment to a specific user, being designated for a RPO value, and assignment to a different secondary storage location (e.g., instances of system 130).

In various embodiments, an instance of I/O queue 105 includes data from a plurality of apps and/or users (discussed in further detail with respect to FIGS. 3a, 3b, and 3c). Elements of data within I/O queue 105 may be assigned a write sequence value (e.g., a write priority, a write schedule). An instance of I/O queue 105 may also include various flags or indicators that identify which elements of data were replicated to a secondary storage location but are awaiting a response message prior to ACM program 200 performing another action, such as removing an element of data from I/O queue 105 or resending an element of data. In an alternative embodiment, I/O queue 105 does not store elements of data; however, I/O queue 105 includes the information required to identify and prioritize data for transfer from stored data 103 to a secondary storage location (e.g., storage site), such as system 130. In an example, computing system 101 or a portion of computing system 101, such as a logical partition or a virtual machine (not shown) is memory constrained. Memory constrains may occur based on inadequate resource provisioning of a logical partition or reallocation of resources from a low-priority user to a high-priority user. Memory constraints may limit the size of write cache and/or free RAM to configure an instance of I/O queue 105. In such an embodiment, elements of data that utilize an asynchronous copy service utilize aspects of I/O queue 105 to copy data from persistent storage of a primary storage location to a secondary storage location, such as system 130.

Communication program 106 includes one or more programs and/or protocols that enable computing system 101 to communicate among device 120 and one or more instances of system 130. In an embodiment, ACM program 200 utilizes communication program 106 to transmit one or more elements (e.g., files, extents, etc.) of data within an instance of I/O queue 105 via network 110 to a designated instance of system 130. In some embodiments, communication program 106 includes capabilities to monitor the activity of network 110 and communicates status information (e.g., network traffic, a speed of data transfer for a network connection, networking delays associated with a port or an instance of system 130, etc.) to ACM program 200 associated with network 110. In various embodiments, communication program 106 applies a cryptographic technique (e.g., encryption, decryption) to data prior to transmission from computing system 101 to a secondary storage location, such as an instance of system 130.

App 107, app 108, and app 109 are representative of applications that execute on computing system 101 that create, modify, and/or utilize data. In one embodiment, one or more apps of computing system 101 operate internal to computing system 101. In another embodiment, one or more apps of computing system 101 execute in response to a user of device 102 interfacing with an app via UI 121. In some embodiments, one or more apps of computing system 101 execute and interface with one or more apps of device 120, such as app 127 (e.g., a server-client relationship).

ACM program 200 is a program that manages the transmission of data for replication to a secondary storage location by the asynchronous copy service by modifying the write sequence of elements of data within an instance of I/O queue 105. In one embodiment, ACM program 200 identifies elements of data, received to a buffer, and identifies the elements of data for replication to a secondary storage location by an asynchronous copy service. ACM program 200 includes the elements of data identified for replication to an I/O queue. In addition, ACM program 200 determines a set of information associated with each element of data added to the I/O queue, such as a RPO value and details associated with a secondary storage, such as an IP address and LUN that stores the element of data. In some scenarios, ACM program 200 determines a wait time in the I/O queue value for an element of data based on an ack message from a primary storage location. In other embodiments, ACM program 200 determines a wait time in the I/O queue for an element of data based a time value related to the creation or modification of the element of data by an app executing within computing system 101. In an embodiment, ACM program 200 organizes (e.g., modifies) an I/O queue based on a calculated PI % for each element of data within the I/O queue. ACM program 200 determines a write sequence to a secondary storage location based on ordering elements of data within an I/O queue from the highest PI % to the lowest PI %. In response to receiving and ack message from a secondary storage location for a replicated element of data, ACM program 200 removes the element of data from the I/O queue.

In various embodiments, ACM program 200 loops in response to one or more triggers or conditions and/or based on a polling rate. ACM program 200 can continually add new elements of data to an I/O queue as one or more elements of data are created and/or remove one or more elements of data from the I/O queue in response to successfully writing the one or more elements of data to a secondary storage location. In response to adding and/or removing elements of data to an I/O queue, ACM program 200 modifies the write sequence of elements of data within the I/O queue. In some embodiments, ACM program 200 includes one or more factors in a PI % calculation for an element of data within an I/O queue. In another embodiment, multiple instances of ACM program 200 can execute concurrently on computing system 101. In an example, different instances of ACM program 200 may be utilized to isolate data related to different customers that share the resources of computing system 101. In another example, different instances of ACM program 200 may be utilized for each instance of system 130 that replicates data of computing system 101.

In one embodiment, computing system 101 communicates through network 110 to device 120 and one or more instances of system 130. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between computing system 101, device 120, and one or more instances of system 130, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.). In some embodiments, network 110 includes one or more monitoring functions that can identify, a speed of data transfer for a network connection, a communication bottle-neck, and one or more delays within network 110, which may be communicated to computing system 101 and affect one or more aspects of ACM program 200.

System 130 is representative of: a network-attached storage (NAS) system, a storage area network (SAN), a SAN-NAS hybrid system, a storage system based on a cloud infrastructure, or any storage device or system utilized as a secondary storage location for data replicated from computing system 101. An instance of system 130 may be utilized as a secondary storage location by a copy service (e.g., a replication function, a backup service) to asynchronously store elements of data associated with one or more apps that execute on system 101 and/or device 120. System 130 includes a plurality of storage entities (e.g., storage devices) and as such, system 130 can receive multiple elements of data for storage among the plurality of storage entities.

System 130 includes storage 132, storage control and monitoring program 135, communication program 136, and various programs and data (not shown). Examples of programs and data that system 130 may include are: an operating system, input/output (I/O) virtualization software or firmware, storage virtualization software, a load balancer, an arbitration function, and encryption software. Data within storage 132 may include networking protocols; storage account information for computing system 101; and a database, hash table, or cross-reference of physical devices (e.g., SE 134A) to LUN values or volume names designated to store elements of data based on information associated with the operations of ACM program 200.

Storage 132 includes a plurality of storage entities (SEs) 133, where each SE 133 includes one or more storage devices, such as SE 134A through 134N. Storage 132 may also include one or more receive buffers (e.g., a buffer of RAM) (not shown) to temporarily store elements of data prior to writing elements of data to storage entities 133 of system 130. In an embodiment, an instance of SE 133 may be representative of a storage tier, such as slower (e.g., high latency) storage of a magnetic tape based system; fast (e.g., low latency) non-volatile storage, such as HDDs; and very fast (e.g., very low latency) non-volatile storage, such as SSDs. In some embodiments, selecting an instance of SE 133 utilized to store data is further controlled by or utilizes a security policy based on the nature of the data stored, such as personal information, medical records, financial transactions, data required for audit or compliance verification.

Storage control and monitoring program 135 is a program that controls the operations of system 130 and processes elements of data received via network 110 for storage among the plurality of storage entities (SE's) of system 130. During the operation of system 130, storage control and monitoring program 135 generates one or more messages that are transmitted to computing system 101 via network 110. The messages generated by storage control and monitoring program 135 indicate a status or response associated with the operations of system 130. In one example, in response to completing a write operation, storage control and monitoring program 135 generates a write acknowledgement message, herein referred to as an ack message, which is communicated to computing system 101. In another example, storage control and monitoring program 135 generates a resend message in response to not receiving a complete element of data via network 110, such as detecting the loss of one or more packets for an element of data transmitted via network 110.

In some embodiments, storage control and monitoring program 135 interfaces with virtualization software (not shown) to create one or more VIOS servers utilized by system 130. In various embodiments, storage control and monitoring program 135 monitors the activity and status of various aspects of system 130, such as storage entity loading, write delays, etc. Communication program 136 includes one or more capabilities previously discussed with respect to communication program 106.

In one embodiment, device 120 may be a computing device of a user that interfaces with computing system 101 to execute one or more apps hosted by or installed on computing device 101. In another embodiment, device 120 interfaces with one or more apps of computing device 101 to further process elements of data generated by one or more apps of device 120. Elements of data associated with one or actions and/or apps executing on device 120 are stored first to stored data 103 and subsequently replicated to an instance of system 130.

Device 120 may include user interface (UI) 121, storage 122, and communication program 126. Storage 122 includes information 124 and apps 127, 128, and 129. In addition storage 122 also stores various programs and data (not shown) utilized by device 120. Examples of programs that storage 122 may include are: an operating system, a web browser, an office productivity suite, cryptographic software, a software development environment, a database program, etc. Examples of data that storage 122 may include, but are not limited to are: user preferences, a web browsing history, tables, software libraries, template files, etc. (not shown) that are utilized by device 120 and/or one or more apps of device 120. In some embodiments, storage 122 includes plug-ins and/or services (not shown) that are utilized by one or more apps of device 120. Information 124 includes some or all of the types of information discussed with respect to user information 104, such as RPO values for elements of data, a service level agreement of a user for computing system 101, and/or computing resources of computing system 101 allocated to an app or I/O queue utilized by the user. Information 124 also includes data and information utilized by app 127, app 128, and app 129, such as a set of data communicated among app 107, app 108, and/or app 109 of computing system 101. Communication program 126 includes one or more capabilities previously discussed with respect to communication program 106.

In one embodiment, UI 121 may be a graphical user interface (GUI) or a web user interface (WUI), and UI 121 can display text, documents, forms, web browser windows, user options, application interfaces, and instructions for operation, and include the information, such as graphic, text, and sound that a program presents to a user. In addition, UI 121 controls sequences/actions that the user employs to execute and/or input information to one or more apps of device 120 and/or computing system 101, and/or create or modify information (e.g., within information 124, within information 104) utilized by ACM program 200. In various embodiments, UI 121 displays one or more icons representing applications that a user can execute via network 110, such as various programs (not shown) of computing system 101 and/or other computing systems accessible via network 110.

In some embodiments, a user of device 120 can interact with UI 121 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 121 operating within the GUI environment of device 120. UI 121 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, UI 121 may receive input in response to a user of device 120 utilizing natural language, such as written words or spoken words, device 120 identifies as information and/or commands.

Figure 2:
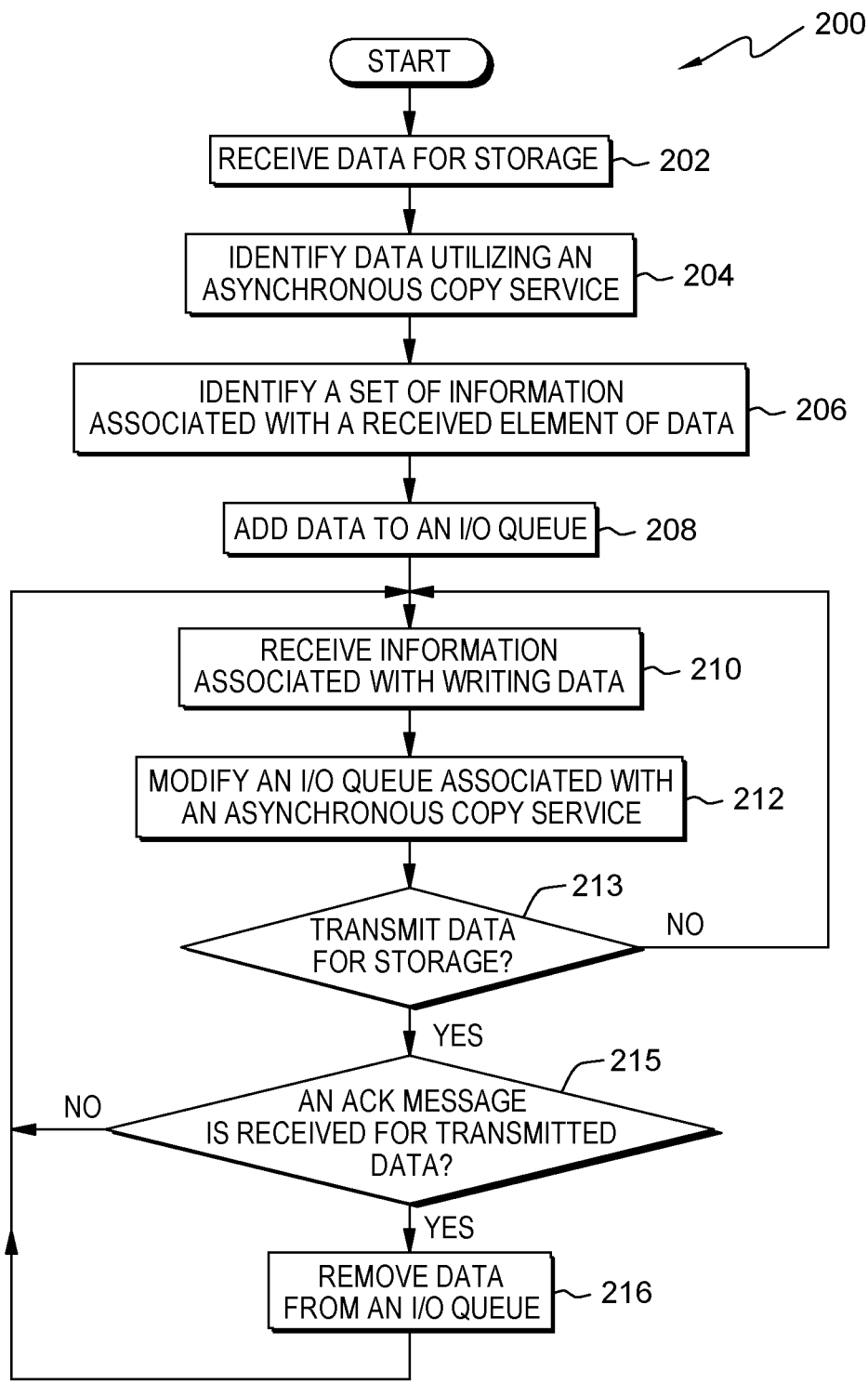
FIG. 2 depicts a flowchart of the operational steps of a file asynchronous copy management program, in accordance with an embodiment of the present invention.

FIG. 2 is a flowchart depicting operational steps for ACM program 200, a program that identifies data that utilizes an asynchronous copy service, manages a queue of elements of data for storage to a secondary storage location, and controls the transmission of data that by the asynchronous copy service to secondary storage location, in accordance with embodiments of the present invention.

In step 202, ACM program 200 receives data for storage. In one embodiment, ACM program 200 receives data for storage to a storage buffer. In another embodiment, ACM program 200 receives information related to data within a storage buffer (not shown). In one scenario, ACM program 200 receives one or more elements of data created, utilized, and/or modified or modified by an app executing on computing system 101, such app 107. In another scenario, ACM program 200 receives one or more elements of data created, utilized, and/or modified or modified by an app executing on device 120; or in response to an app executing on device 120, such as app 109 responding to the execution of app 128. In various embodiments, ACM program 200 can received one or more elements of data from an app as various data structures, such portions of data (e.g., one or more fragments, one or more blocks, one or more extents, etc.) or an entire file. In some embodiments, ACM program 200 tracks the source of the one or more elements of data received for storage, such as a first set of elements of data is associated with app 107 and a second set of elements of data is associated with app 109. In various embodiments, ACM program 200 receives filtered data. In an example, ACM program 200 receives data that is filtered based on one or more filters defined within information 104, such as to exclude temporary data files.

In step 204, ACM program 200 identifies data utilizing an asynchronous copy service. In one embodiment, ACM program 200 utilizes information within information 104 to identify one or more elements of data utilizing an asynchronous copy service. In an example, ACM program 104 determines that an element of data generated by or modified by app 108 is temporary data and another element of the data generated by or modified by app 108 is data that is stored to system 130 via an asynchronous copy service. In another embodiment, ACM program 200 identifies that an element of data utilizes an asynchronous copy service based on inclusion of the data within an instance of I/O queue 105 designated for an asynchronous copy service. In some embodiments, ACM program 200 analyzes header information and/or metadata associated with a received element of data to identify data that utilizes an asynchronous copy service. In other embodiments, ACM program 200 identifies an element of data that utilizes an asynchronous copy service based on information communicated from information 124 of device 120 to computing system 101.

In step 206, ACM program 200 identifies a set of information associated with a received element of data. In an example, a set of information associated with a received element of data can include an IP address for an instance of system 130, a LUN value for a SE within the instance of system 130, and RPO value for the received data. Other information within the set of information identified by ACM program 200 can also include a user or process ID and a corresponding password or certificate to access or utilize an instance of system 130. In one embodiment, ACM program 200 obtains a set of information from a profile included in information 104. In another embodiment, ACM program 200 obtains a set of information from information 124. In some embodiments, ACM program 200 identifies a set of information from a combination of information within information 104 and information 124. In various embodiments, ACM program 200 determines a timestamp corresponding to the received data and/or ack message related to writing the data to a primary storage location. In addition, ACM program 200 may start a timer corresponding to the received element of data, where the timer is utilized to determine a wait time corresponding to a duration of time that the received element of data is stored (e.g., buffered) in an instance of I/O queue 105.

In step 208, ACM program 200 adds data to an I/O queue. An I/O queue may include information associated with each element of data of the I/O queue, such as an ID of an element of data, an I/O sequence number, and an owner of an element of data. In addition, an I/O queue may also include a wait time in queue for each element of data and a corresponding RPO value for each element of data.

In one embodiment, ACM program 200 sequentially adds one or more elements of data to an instance of I/O queue 105 associated with data that utilizes an asynchronous copy service. In another embodiment, ACM program 200 adds one or more elements of data to another data structure (e.g., as opposed to a queue). In one scenario, ACM program 200 adds one or more elements of data to a data buffer (not shown) prior to migrating the elements of data in the data buffer to an instance of I/O queue 105. In an example, ACM program 200 utilizes a polling rate to control the migration of data from a buffer to an instance of I/O queue 105. In some embodiments, ACM program 200 adds data to an instance of I/O queue 105 that corresponds to a designated instance of system 130. In various embodiments, ACM program 200 filters the data received for storage prior to adding data to an I/O queue based, at least in part of the determine set of information corresponding to the received data. In other embodiments, ACM program 200 delays adding data to an I/O queue until ACM program 200 receives an ack message indicating that one or more elements of data are successfully written to a primary storage location, such as stored data 103.

In step 210, ACM program 200 receives information associated with writing data. In one embodiment, ACM program 200 receives information associated with writing one or more elements of data via communication program 106 communicating with one or more instances of system 130. In one scenario, ACM program 200 receives information corresponding to an ack message received from an instance of system 130 (loop via Yes branch of decision step 215) for a corresponding element of data. In another scenario, ACM program 200 receives information (e.g., messages) different from an ack message from an instance of system 130, such as a resend message or a write failure message (loop via No branch of decision step 215) for a corresponding element of data. In response to receiving messages other than an ack message, ACM program 200 may modify the write sequence of an instance of I/O queue 105 based, at least in part, on increasing wait times for elements of data in the instance of I/O queue 105.

In some embodiments, ACM program 200 receives information associated with delays that affect writing data. In one scenario, ACM program 200 receives information related to networking delays, such as a slow network connection speed that affects writing data to an instance of system 130. In one example, ACM program 200 receives information related to networking delays from communication program 106. In another example, ACM program 200 receives information related to networking delays from network 110. In another scenario, ACM program 200 receives information from a secondary storage location related to delays within the secondary storage location (e.g., an instance of system 130) that affects writing data. In one example, SE 134K thru SE 134M of system 130 are bandwidth (e.g., workload) constrained based on SE 134K thru SE 134M sharing storage capacity with apps executing on another computing system (not shown). In response, ACM program 200 receives information related to access (e.g., write) delays for SE 134K thru SE 134M from storage control and monitoring program 135. However, storage control and monitoring program 135 may indicate that little to no delays are related to SE 134A thru SE 134J. In another example, ACM program 200 receives information related to write delays from storage control and monitoring program 135 of system 130 based on the latency of a SE within a storage Tier (not shown) of system 130, and/or write delays based on a level of security (e.g., encryption) for an element data stored by system 130.

Still referring to step 210, in various embodiments, ACM program 200 determines information associated with writing data. ACM program 200 may determine a time in I/O queue 105 (e.g., a wait time) corresponding to each element of data within a respective instance I/O queue 105. In one scenario, ACM program 200 determines a time in I/O queue 105 corresponding to each element of data within a respective instance of I/O queue 105 based on a timer or timestamp corresponding to each element of data. In another scenario, ACM program 200 determines a time in I/O queue 105 corresponding to each element of data, within a respective instance of I/O queue 105, based on any network delays and/or delays of the secondary storage location (e.g., an instance of system 130) with respect to each element of data in addition to a timer or timestamp corresponding to each element of data.

In step 212, ACM program 200 modifies an I/O queue associated with an asynchronous copy service. In various embodiments, ACM program 200 modifies an I/O queue associated with an asynchronous copy service on a periodic basis. In some scenarios, based on a predefined polling rate, ACM program 200 determines whether to modify an I/O queue associated with an asynchronous copy service. In other scenarios, ACM program 200 modifies an I/O queue associated with an asynchronous copy service based on one or more triggers, such as events (e.g., delays, outages, etc.) within networked computing system 100, a size (e.g., number of elements of data) within the data buffer, a size of an instance of I/O queue 105, and/or one or more received messages different from an ack message.

In one embodiment, ACM program 200 modifies an instance of I/O queue 105 that is associated with an asynchronous copy service based on calculating a PI % values for each element of data within the instance of I/O queue 105. ACM program 200 calculates a PI % corresponding to an element of data within an instance of I/O queue 105 based on a wait time in queue of the element of data divided by a RPO value corresponding to the element of data. ACM program 200 may further assign a write sequence (e.g., index, increment) value to the elements of data within an instance of I/O queue 105. In an example, ACM program 200 assigns a write sequence value of 1 to the first element of data within an instance of I/O queue 105 that is first to transmit, and a write sequence value of 5 to the fifth element of data to transmit. In some embodiments, ACM program 200 includes various delay times corresponding to elements of data within an instance of I/O queue 105 in response to calculating a PI % corresponding to elements of data within the instance of I/O queue 105.

In another embodiment, ACM program 200 modifies an I/O queue associated with an asynchronous copy service based on one or more changes within system 101. In one scenario, ACM program 200 modifies an I/O queue associated with an asynchronous copy service based on a removal of one or more elements of data from the I/O queue in response to successfully writing the one or more elements of data to a secondary storage location. In another scenario, ACM program 200 modifies an I/O queue associated with an asynchronous copy service based on ACM program 200 adding one or more new elements of data to the I/O queue. In some scenarios, ACM program 200 modifies an I/O queue associated with an asynchronous copy service based on a duration of time. In an example, the wait time in I/O queue increases for each element of data that was not transmitted to a secondary storage location. In other scenarios, ACM program 200 modifies an I/O queue associated with an asynchronous copy service based on the information received that relates to one or more delays within networked computing environment 100, such as networking delays and write delays associated with a secondary storage location. In various scenarios, ACM program 200 modifies an I/O queue associated with an asynchronous copy service based on a combination of the aforementioned scenarios.

In decision step 213, ACM program 200 determines whether to transmit data for storage. In one embodiment, ACM program 200 determines to transmit data for storage within a secondary storage system in response to receiving an ack message that indicates a successful write (e.g., storage) of an element of data to a primary storage location, such as stored data 103. In another embodiment, ACM program 200 determines to transmit data for storage to an instance of system 130, based on receiving an ack message from storage control and monitoring program 135 corresponding to the instance of system 130 indicating the successful storage of a previously transmitted element of data to the instance of system 130.

In some embodiments, ACM program 200 determines to transmit two or more elements of data for storage on an instance of system 130. ACM program 200 can transmit two or more elements of data to an instance system 130 based on one or more conditions, such as receiving corresponding ack messages indicating a successful storage of two or more previously transmitted elements of data, I/O queue 105 includes one or more elements of data for storage on SEs of the instance of system 130 that are available for writing data, in response to one or more messages other than an ack message, or a combination thereof. In one example, ACM program 200 receives ack messages from an instance of system 130 indicating that the elements of data designated for storage to SE 134C and SE 134G are successfully written to SE 134C and SE 134G. Therefore, ACM program 200 may transmit the next element of data designated for storage on SE 134C or SE 134G. In another example, ACM program 200 transmits data for storage based on another received message, such as a resend message, a timeout message, or a write failure message. In another example, ACM program 200 may transmit multiple elements of data from I/O queue 105 up to a receive buffer capacity of system 130, such as 2 GB of data.

In various embodiments, ACM program 200 determines to write data to storage based on overriding one or more elements of data scheduled in a write sequence based on one or more conditions, such as timeout waiting for a response from system 130, a target SE is unavailable (e.g., a busy or unavailable message), or if an arbitration function (not shown) of system 130 determines that another thread or process has write priority to a target SE. ACM program 200 can skip (e.g., not transmit) one or more elements of data in I/O queue 105 and transmit at least the first element of data of the write sequence that is not affected by the one or more conditions.

In response to determining to transmit data (Yes branch, decision step 213), ACM program 200 utilizes communication program 106 to transmit respective copies of one or more elements of data from an instance of I/O queue 105 to an instance of system 103. ACM program 200 utilizes a set of information associated with an element of data within an instance of I/O queue 105 to determine a secondary storage location that receives the one or more transmitted elements of data and a corresponding target SE for the element of data. In an embodiment, ACM program 200 utilizes communication program 106 to transmit one or more elements of data at the head of an instance of I/O queue 105 based on one or more determinations, such as elements of data with the highest PI % value, one or more write ack messages, and/or a value of a write sequence (e.g., index) of an element of data. In response to transmitting data for storage, ACM program 200 determines whether an ack messages is received for the transmitted data (decision step 215).

In decision step 215, in response to transmitting data for storage, ACM program 200 determines whether an ack message is received for transmitted data. In an example, storage control and monitoring program 135 of system 130 generates an ack message in response to successfully writing a received element of data (e.g., a copy of an element of data) to a target SE of system 130. System 130 transmits the ack message via network 110 to computing system 101. In one embodiment, ACM program 200 determines that an ack message is received from an instance of system 130 for an element of data (e.g., a copy of an element of data) transmitted for storage. In another embodiment, ACM program 200 determines that an ack message is not received from an instance of system 130 that stores the one or more elements of data transmitted for storage. In some embodiments, ACM program 200 determines that an ack message is received from an instance of system 130 for only some elements of data transmitted for storage. In an alternative embodiment, ACM program 200 receives a message different from an ack message from a secondary storage location, such as an instance of system 130.

In response to determining that an ack message is received for a transmitted element of data (Yes branch, decision step 215), ACM program 200 removes data from an I/O queue (step 216).

In step 216, ACM program 200 removes data from an I/O queue. In one embodiment, ACM program 200 removes (e.g., deletes, dequeues) an element of data (e.g., an original instance of the element of data) from an instance of I/O queue 105 for each ack message corresponding to a successful write of an element of data to a designated instance of system 130. In addition, ACM program 200 may delete a set of information related to the removed element of data, such as I/O sequence value, I/O owner, RPO value, PI %, etc. (discussed in further detail with respect to FIGS. 3a, 3b, and 3c). In an alternative embodiment, if the original element of data is stored within another location, such as stored data 103, then ACM program 200 does not remove the element of data from stored data 103. However, ACM program 200 will delete the information and reference data associated with the element of data for removal, such as deleting the row corresponding to the element of data from table 300 (referring to FIG. 3c). Subsequently, ACM program 200 loops to step 210. In some embodiments, ACM program 200 loops to step 210 in real-time. In other embodiments, ACM program 200 loops to step 210 based on a polling rate or response to one or more triggers.

Referring to decision step 215, in response to determining that an ack message is not received for an element of transmitted data (No branch, decision step 215), ACM program 200 loops to step 210. In some embodiments, ACM program 200 loops to step 210 in real-time. In other embodiments, ACM program 200 loops to step 210 based on a polling rate or in response to one or more triggers.

Referring to decision step 213, in response to determining not to transmit data for storage (No branch, decision step 213), ACM program 200 loops to step 210. In some embodiments, ACM program 200 loops to step 210 in real-time. In other embodiments, ACM program 200 loops to step 210 based on a polling rate or response to one or more triggers.

FIG. 3a is an illustrative example of Table 300 comprised of sets of information associated with elements of data for an instance of I/O queue 105 based on a FIFO strategy for utilizing an asynchronous copy service to replicate data of a primary storage location to a secondary storage location, in accordance with embodiments of the present invention. A set of information within a row is related. Column 301 indicates a write sequence value (i.e., order) corresponding to elements of data stored within an instance of I/O queue 105, at one instance of time, for storage to one or more SEs of system 130. In this illustrative example, write sequence (i.e., seq.) value 1 is the head of the I/O queue and write sequence value 16 is the tail of this I/O queue. In various embodiments, the number of items that comprise the write sequence of an I/O queue varies with time.

Information within columns 302 thru 308 can vary with time, as one or more elements of data are added to I/O queue 105, and/or one or more elements of data are removed from I/O queue 105 and the information within each row is related. In an example, data ID "A" is created and/or modified by App2, and based on information within information 104 for App2, data ID "A" is identified for storage to a secondary storage location and has an RPO value of 10 seconds. In addition, based on the order in which data ID "A" is created and/or modified, Data ID "A" is assigned an I/O sequence value (e.g., indication) of 100. Further, on a wait time in queue of 11.0 seconds, data ID "A" has a calculated PI % of 110%. The write sequence values of column 301 are associated with different elements of data as elements of data are added to, removed from, and/or rearranged within table 300.

Column 302 relates to I/O sequence values of the elements of data, buffered within an instance of I/O queue 105. An I/O sequence value corresponds to a set of memory locations, such as portions RAM allocated to the instance of I/O queue 105 that buffer an element of data, such as a file corresponding to a data ID (e.g., the file name) within column 303. Within column 302, the I/O sequence values increase with time and as additional elements of data are created and/or modified. However, the I/O sequence values of column 302 are not strictly sequential. I/O sequence values not depicted within column 302 may indicate that one or more elements of data are created, but not assigned to the depicted instance of I/O queue 105. In one example, I/O sequence 108 and 110 (not shown) are not included in this instance of I/O queue 105 based on being temporary elements of data that are not stored to a primary; and therefore, not stored to a secondary storage location. In another example, I/O sequence 102 and 105 (not shown) are not included in this instance of I/O queue 105 based on being stored to a different instance of system 130. I/O sequence 102 and 105 are stored to a different secondary storage location based on a different security dictate from the data ID's associated with I/O sequence 100, 101, 103, 104, 106, 107, and 109.

Column 303 lists data ID's, such as file names for elements of data that are created and/or modified by one of three apps (i.e., App1, App2, and App3). Referring to FIG. 1, App1, App2, and App3 may be representative of app 107, app 108, and app 109. Column 304 indicates the I/O owner, in this instance App1, App2, or App3 that created and/or modified an element of data associated with a data ID within column 303. In an example, data IDs "C, F, H, and M" are associated with App3. Column 304 also includes additional information, in parenthesis, related to a data ID and I/O owner. In FIGS. 3a, 3b, and 3c the information in parenthesis in column 304 corresponds to RPO values, in seconds, for a corresponding data ID. In the above example, data ID "C" has a RPO value of 2 seconds, data IDs "F and H" have RPO values of 5 seconds, and data ID "M" has a RPO value of 10 seconds.

Column 305 indicates a wait time, in seconds, for a corresponding data ID within column 303. A "wait time in queue" is a duration of time that an element of data resides in an I/O queue. The "wait time in queue" for an element of data can be determined in various manners. In one embodiment, the wait time of column 305 is related to a difference between snapshot in time, such as a current timestamp and a timer value and/or timestamp value based on a point in time that an element of data corresponding to a data ID was created and/or modified. In another embodiment, the wait time for an element of data within column 305 corresponds to difference between a snapshot in time, such as a current timestamp and a timer value and/or timestamp value based on a point in time that an element of data corresponding to a data ID was created and/or modified and one or more identified delays. For example, ACM program 200 may identify information related to networking delays (previously discussed with respect to FIG. 2, step 210).

Columns 306, 307, and 308 are associated with the priority index percentage (PI %) values for each of the three RPO values utilized by one or more elements of data (e.g., data IDs) associated with App1, App2, and App3. Column 306 indicates PI % values corresponding data IDs with a RPO value of 2 seconds. Column 307 indicates PI % values corresponding data IDs with a RPO value of 5 seconds. Column 308 indicates PI % values corresponding data IDs with a RPO value of 10 seconds.

In an embodiment, ACM program 200 calculates PI % values based on a wait time in queue value (column 305) for a corresponding element of data (e.g., data ID) divided by the RPO value related to the data ID. In an example, with respect to FIG. 3a, data ID "B" is associated with data with an RPO value of 5 seconds and in wait time in queue value of 5.4 seconds, which yields a PI % of 108% (5.4/5.0). In some embodiments, ACM program 200 calculates PI % values based on a sum of a wait time in queue value (column 305) for a corresponding data ID and information associated with writing data (e.g., networking delays), divided by the RPO value related to the data ID. In an example, SE 134L of system 130 stores data ID "B." If SE 134L experiences a write delay of 0.3 seconds due to a heavy workload of data for SE 134L, then ACM program 200 calculates a PI % of 114% ((5.4+0.3)/5.0) for data ID "B."

As depicted in FIG. 3a, based on a FIFO write strategy for an asynchronous copy service, the PI % (reverse tone) corresponding to four elements of data indicate that data IDs "A, B, C, and G", corresponding to I/O sequence 100, 101, 103, and 109 (reverse tone) meet or exceed the RPO respectively associated with data IDs "A, B, C, and G" based on the wait time in queue. Therefore, data IDs "A, B, C, and G" are further out-of-sync with corresponding elements of data (not shown) within stored data 103 than a dictated target RPO value associated with a respective data ID. Based on write sequence values within column 301, data IDs "A, B, and C" respectively write to an instance of system 130 in the order of data ID "A, B, and C."

However, as depicted in column 307 data IDs "D, E, and F" are less out-of-sync than data ID "G" based on corresponding calculated PI % values of 52%, 48%, and 44%, as contrasted with data ID "G" with a correspond PI % of 105% (reverse tone within column 306). Since data IDs "D, E, and F" are written to an instance of system 130 prior to data ID "G," data ID "G" may become further out-of-sync with respect to a corresponding element of data within stored data 103 by the time data ID "G" reaches the head (e.g., write sequence 1) of this illustrative instance of I/O queue 105. Therefore, based on a FIFO write strategy, data IDs "A, B, C, and G" do not write to an instance of system 130 based on minimizing an out-of-sync (e.g., PI %) criteria for targeted RPO values. For example, data ID "C" has a corresponding PI % value of 150% as opposed to data ID "A" with a corresponding PI % value of 110%, and data ID "B" with a corresponding PI % value of 108%.

FIG. 3b is an illustrative example of Table 300 for an instance of I/O queue 105 modified based an asynchronous copy service utilizing a write strategy for prioritizing to write elements of data to an instance of system 130 based on a hierarchy of (i) a criteria of ordering RPO values from smallest to largest, as indicated within column 304, and (ii) based on a criteria of increasing I/O sequence values (e.g., column 302). In this illustrative example, data ID "C" has a write sequence value (e.g., 1) indicative of minimizing an out-of-sync criteria. Within FIG. 3b, the PI % values of columns 306, 307, and 308 are only calculated to illustrate the effects of this write prioritization strategy on out-of-sync conditions for various elements of data within Table 300. However, an out-of-sync condition for data ID "B" increases, moving from a write sequence value 2 with respect to FIG. 3a to write sequence 5 with respect to FIG. 3b. In addition, out-of-sync condition for data ID "A" will increases even further with respect to the target RPO value of 10 seconds; (i) by moving from write sequence value 1 in as depicted within FIG. 3a to write sequence 12 as depicted within FIG. 3b, and (ii) by an increased time in queue based on wait time (e.g., delays) related to writing data IDs "G, N, Q, B, D, E, F, H, J, and L" from I/O queue 105 to system 130 prior to writing data ID "A" to system 130. Based on the aforementioned write strategy other elements of data within Table 300 also have increased out-of-sync condition. However, the wait time in queue for these other elements of data, such as data ID "E" do not meet or exceed the RPO value associated with the element of data.

FIG. 3c is an illustrative example of Table 300 for an instance of I/O queue 105, modified based an asynchronous copy service utilizing various embodiments of the current invention. The depicted write prioritization strategy is based on decreasing PI % values that minimizes the out-of-sync conditions with respect to RPO values for the elements of data within an illustrative instance of I/O queue 105. As depicted, four elements of data (i.e., IDs "C, A, B, and G") meet or exceed respective target RPO values. As depicted among columns 301, 306, 307, and 308 data IDs "C, A, B, and G" are scheduled to write to an instance of system 130 based on decreasing PI % values. In addition, as depicted among columns 306, 307, and 308 the other elements of data of the illustrative example of I/O queue 105 are similarly ordered based on decreasing PI % values, such as data ID "D" is scheduled in write sequence 5 with a PI % of 52%, to data ID "P" scheduled in write sequence 16 with a PI % of 4%.

In one example with respect to FIG. 3c, in response to ACM program 200 receiving information to transmit data IDs "C, A, and B" (referring to FIG. 2, step 210 and Yes branch of decision step 213) to system 130. In response to receiving ack message for data IDs "C, A, and B" ACM program 200 removes (e.g., dequeues) the elements of data from I/O queue 105 and deletes information associated with write sequence values 1, 2, and 3 (referring to FIG. 2, Yes branch of decision step 215 and step 216).

In a further example based on FIG. 3c, in response to ACM program 200 receiving information from system 130 that the SEs utilized by App1 are experiencing write response delay of 0.3 seconds, thus affecting data IDs "B, G, E, I, K, Q, and P." ACM program 200 modifies an I/O queue (referring to FIG. 2, step 212). Data ID "G" of App1, with a recalculated PI % of 120%, is promoted to write sequence value 2 and data ID "A" (PI % of 110%) of App2 is demoted to write sequence value 4. The write sequence value for data ID "B" is unaffected. Data ID "E" of App1, with a recalculated PI % of 54%, is promoted to write sequence value 5 and data ID "D" (PI % of 52%) of App2 is demoted to write sequence value 6. Data ID "Q" of App1, with a recalculated PI % of 25%, is promoted from write sequence value 14 to write sequence value 10, based on a PI % of 20 for data ID "L" of App2. However, data ID P remains assigned to write sequence value 16 based on a PI % of 7% which is less than the PI % of 8% associated with data ID "M" of App3.

Figure 4:
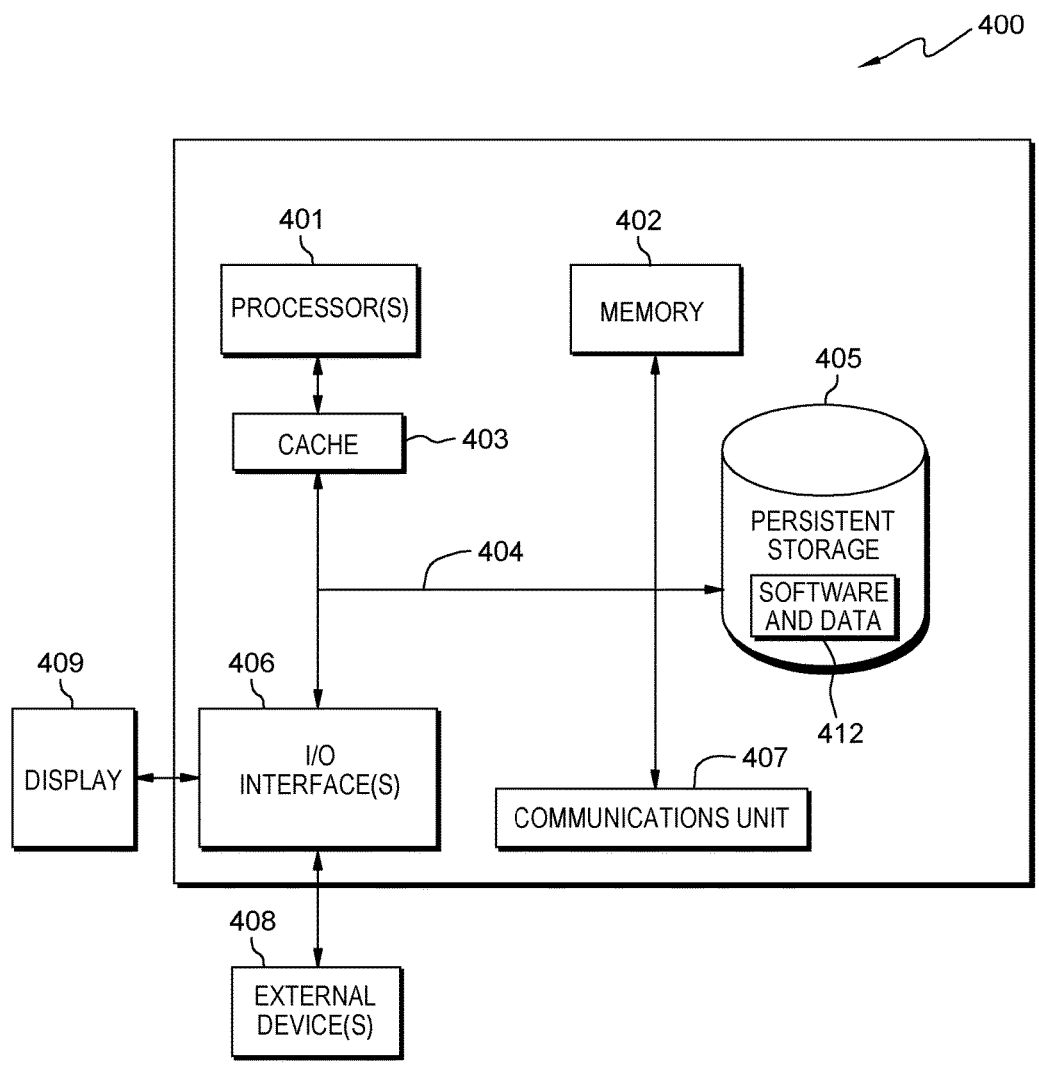
FIG. 4 is a block diagram of components of a computer, in accordance with an embodiment of the present invention.

FIG. 4 depicts a block diagram of computer system 400, which is representative of computing system 101, device 120, and system 130. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and I/O interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402. In an embodiment, with respect to computing system 101, a portion of storage 102 and I/O queue 105 are based on memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, with respect to computing system 101, storage 102 is included in persistent storage 405.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing system 101, software and data 412 includes: information 104, App 107, App 108, App 109, communication program 106, ACM program 200, and various programs (not shown). In addition, a portion of persistent storage 405 may be allocated for stored data 103. With respect to device 120, software and data 412 includes UI 121, information 124, App 127, App 128, App 129, communication program 126, and various programs and data (not shown). With respect to system 130, software and data 412 includes: storage control and monitoring program 135, communication program 136, and various programs and data (not shown). In addition, a portion of persistent storage 405 may be allocated for storage entities 133 comprised of SE 134A thru SE 134N.

Communications unit 407, in these examples, provides for communications with other data processing systems or devices, including resources of computing system 101, device 120, and system 130. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing data replicated by an asynchronous copy service, the method comprising:
    identifying, by one or more computer processors, a set of information associated with an element of data stored in an I/O queue;
    modifying, by one or more computer processors, an order to transmit elements of data in the I/O queue based, at least in part, on the identified set of information associated with the element of data in the I/O queue; and
    transmitting, by one or more computer processors, one or more elements of data in the I/O queue, to a secondary storage location that is network accessible, based at least in part on the order to transmit elements of data in the I/O queue, wherein transmitting one or more elements of data within the I/O queue, to the secondary storage location that is network accessible based, at least in part, on the order to transmit elements of data in the I/O queue further comprises:

transmitting, by one or more computer processors, a copy of the one or more elements in the I/O queue to the secondary storage location that is network accessible based on the order to transmit elements of data in the I/O queue, wherein transmitting to the secondary storage location is controlled by an asynchronous copy service;

receiving, by one or more computer processors, from the secondary storage location, a write acknowledgement message in response to transmitting a copy of an element of data of the one or more elements of data in the I/O queue to the secondary storage location; and in response to receiving the write acknowledgement message corresponding to the transmitted copy of the element of data to the secondary storage location, removing, by one or more processors, from the I/O queue, an element of data corresponding to the received write acknowledgement message.

2. The method of claim 1, wherein the identified set of information associated with the element of data includes a recovery point objective (RPO) value and a duration of time that the element of data has resided in the I/O queue.

3. The method of claim 1, wherein modifying the order to transmit elements of data in the I/O queue based, at least in part, on the identified set of information respectively associated with the element of data in the I/O queue further comprises:

calculating, by one or more computer processors, a priority index (PI) value corresponding to elements of data within the I/O queue, wherein a PI value is calculated for a first element of data, at least in part, by dividing a duration of time that the first element of data that resides in the I/O queue, prior to transmission to the secondary storage location, by the RPO value corresponding to the first element of data within the I/O queue; and modifying, by one or more computer processors, the order to transmit the elements of data of the I/O queue based, at least in part, on the calculated PI values of the elements of data with the I/O queue.

4. The method of claim 3, wherein calculating the priority index (PI) value corresponding to elements of data within the I/O queue further comprises:

identifying, by one or more computer processors, a delay that affects transmission of a second element of data within the I/O queue to the secondary storage location that is network accessible; and modifying, by one or more computer processors, the order to transmit the elements of data of the I/O queue based, at least in part, on including the identified delay that affects transmission of the second element of data in calculating a PI value for the second element of data on the I/O queue.

5. The method of claim 1, further comprising:

updating, by one or more computer processors, on a periodic basis, the I/O queue wherein the basis for updating the I/O queue is selected from the group consisting of:

removing one or more elements of data from the I/O queue, receiving to the I/O queue one or more new of elements of data that are replicated utilizing an asynchronous copy service, determining changes to durations of time respectively associated with the elements of data that reside in the I/O queue, and receiving information that affects the transmission of one or more elements of data from the I/O queue to the secondary storage location.

6. The method of claim 1, wherein the identified set of information for the element of in an I/O queue includes information selected from the group consisting of an indication of the secondary storage location, an indication for a storage entity within the secondary storage location that stores an element of data, one or more conditions that affects the transmission of the element of data, and one or more conditions that affects calculating a priority index (PI) value for the element of data.

7. A computer program product for managing data replicated by an asynchronous copy service, the computer program product comprising:

one or more computer readable storage media and program instructions stored on the one or more computer readable storage media, the program instructions readable/executable by one or more computer processors and further comprising:

program instructions to identify a set of information associated with an element of data stored in an I/O queue;

program instructions to modify an order to transmit elements of data in the I/O queue based, at least in part, on the identified set of information associated with the element of data in the I/O queue; and program instructions to transmit one or more elements of data in the I/O queue, to a secondary storage location that is network accessible, based at least in part on the order to transmit elements of data in the I/O queue, wherein program instructions to transmit one or more elements of data within the I/O queue, to the secondary storage location that is network accessible based, at least in part, on the order to transmit elements of data in the I/O queue further comprises:

program instructions to transmit a copy of the one or more elements in the I/O queue to the secondary storage location that is network accessible based on the order to transmit elements of data in the I/O queue, wherein transmitting to the secondary storage location is controlled by an asynchronous copy service;

program instructions to receive, from the secondary storage location, a write acknowledgement message in response to transmitting a copy of an element of data of the one or more elements of data in the I/O queue to the secondary storage location; and program instructions to respond to receiving the write acknowledgement message corresponding to the transmitted copy of the element of data to the secondary storage location, by removing, from the I/O queue, an element of data corresponding to the received write acknowledgement message.

8. The computer program product of claim 7, wherein the identified set of information associated with the element of data includes a recovery point objective (RPO) value and a duration of time that the element of data has resided in the I/O queue.

9. The computer program product of claim 7, wherein program instructions to modify the order to transmit elements of data in the I/O queue based, at least in part, on the identified set of information respectively associated with the element of data in the I/O queue further comprises:

program instructions to calculate a priority index (PI) value corresponding to elements of data within the I/O queue, wherein a PI value is calculated for a first element of data, at least in part, by dividing a duration of time that the first element of data that resides in the I/O queue, prior to transmission to the secondary storage location, by the RPO value corresponding to the first element of data within the I/O queue; and program instructions to modify the order to transmit the elements of data of the I/O queue based, at least in part, on the calculated PI values of the elements of data with the I/O queue.

10. The computer program product of claim 9, wherein calculating the priority index (PI) value corresponding to elements of data within the I/O queue further comprises:

program instructions to identify a delay that affects transmission of a second element of data within the I/O queue to the secondary storage location that is network accessible; and program instructions to modify the order to transmit the elements of data of the I/O queue based, at least in part, on including the identified delay that affects transmission of the second element of data in calculating a PI value for the second element of data on the I/O queue.

11. The computer program product of claim 7, further comprising:

program instructions to update, on a periodic basis, the I/O queue, wherein the basis for updating the I/O queue is selected from the group consisting of:

removing one or more elements of data from the I/O queue, receiving to the I/O queue one or more new of elements of data that are replicated utilizing an asynchronous copy service, determining changes to durations of time respectively associated with the elements of data that reside in the I/O queue, and receiving information that affects the transmission of one or more elements of data from the I/O queue to the secondary storage location.

12. The computer program product of claim 7, wherein the identified a set of information for the element of in an I/O queue includes information selected from the group consisting of an indication of the secondary storage location, an indication for a storage entity within the secondary storage location that stores an element of data, one or more conditions that affects the transmission of the element of data, and one or more conditions that affects calculating a priority index (PI) value for the element of data.

13. A computer system for managing data replicated by an asynchronous copy service the computer system comprising:

one or more computer processors;
one or more computer readable storage media;
program instructions stored on the computer readable storage media for reading/execution by at least one of the one or more computer processors, the program instructions further comprising:

program instructions to identify a set of information associated with an element of data stored in an I/O queue;

program instructions to modify an order to transmit elements of data in the I/O queue based, at least in part, on the identified set of information associated with the element of data in the I/O queue; and program instructions to transmit one or more elements of data in the I/O queue, to a secondary storage location that is network accessible, based at least in part on the order to transmit elements of data in the I/O queue, wherein program instructions to transmit one or more elements of data within the I/O queue, to the secondary storage location that is network accessible based, at least in part, on the order to transmit elements of data in the I/O queue further comprise:

program instructions to transmit a copy of the one or more elements in the I/O queue to the secondary storage location that is network accessible based on the order to transmit elements of data in the I/O queue, wherein transmitting to the secondary storage location is controlled by an asynchronous copy service;

program instructions to receive, from the secondary storage location, a write acknowledgement message in response to transmitting a copy of an element of data of the one or more elements of data in the I/O queue to the secondary storage location; and program instructions to respond to receiving the write acknowledgement message corresponding to the transmitted copy of the element of data to the secondary storage location, by removing, from the I/O queue, an element of data corresponding to the received write acknowledgement message.

14. The computer system of claim 13, wherein the identified set of information associated with the element of data includes a recovery point objective (RPO) value and a duration of time that the element of data has resided in the I/O queue.

15. The computer system of claim 13, wherein program instructions to modify the order to transmit elements of data in the I/O queue based, at least in part, on the identified set of information respectively associated with the element of data in the I/O queue further comprises:

program instructions to calculate a priority index (PI) value corresponding to elements of data within the I/O queue, wherein a PI value is calculated for a first element of data, at least in part, by dividing a duration of time that the first element of data that resides in the I/O queue, prior to transmission to the secondary storage location, by the RPO value corresponding to the first element of data within the I/O queue; and program instructions to modify the order to transmit the elements of data of the I/O queue based, at least in part, on the calculated PI values of the elements of data with the I/O queue.

16. The computer system of claim 13, further comprising:
program instructions to update, on a periodic basis, the I/O queue, wherein the basis for updating the I/O queue is selected from the group consisting of:

removing one or more elements of data from the I/O queue, receiving to the I/O queue one or more new of elements of data that are replicated utilizing an asynchronous copy service, determining changes to durations of time respectively associated with the elements of data that reside in the I/O queue, and receiving information that affects the transmission of one or more elements of data from the I/O queue to the secondary storage location.

17. The computer system of claim 15, wherein calculating the priority index (PI) value corresponding to elements of data within the I/O queue further comprises:

program instructions to identify a delay that affects transmission of a second element of data within the I/O queue to the secondary storage location that is network accessible; and program instructions to modify the order to transmit the elements of data of the I/O queue based, at least in part, on including the identified delay that affects transmission of the second element of data in calculating a PI value for the second element of data on the I/O queue.

18. The computer system of claim 13, wherein the identified a set of information for the element of in an I/O queue includes information selected from the group consisting of an indication of the secondary storage location, an indication for a storage entity within the secondary storage location that stores an element of data, one or more conditions that affects the transmission of the element of data, and one or more conditions that affects calculating a priority index (PI) value for the element of data.

* * * * *